US011595874B2

United States Patent
Guo et al.

(10) Patent No.: US 11,595,874 B2
(45) Date of Patent: Feb. 28, 2023

(54) ROUTING DATA IN WIRELESS NETWORK THAT COEXISTS WITH INTERFERING WIRELESS NETWORKS

(71) Applicants: Mitsubishi Electric Research Laboratories, Inc., Cambridge, MA (US); Mitsubishi Electric Corporation, Tokyo (JP)

(72) Inventors: Jianlin Guo, Cambridge, MA (US); Philip Orlik, Cambridge, MA (US); Yukimasa Nagai, Tokyo (JP); Takenori Sumi, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/316,812

(22) Filed: May 11, 2021

(65) Prior Publication Data
US 2022/0377643 A1 Nov. 24, 2022

(51) Int. Cl.
*H04W 40/16* (2009.01)
*H04W 40/18* (2009.01)
(Continued)

(52) U.S. Cl.
CPC .............. *H04W 40/16* (2013.01); *H04L 45/02* (2013.01); *H04L 45/08* (2013.01); *H04L 45/123* (2013.01);
(Continued)

(58) Field of Classification Search
None
See application file for complete search history.

(56) References Cited

U.S. PATENT DOCUMENTS

| 11,050,619 | B1* | 6/2021 | Zhao | H04L 43/0817 |
|---|---|---|---|---|
| 2011/0116389 | A1* | 5/2011 | Tao | H04L 45/18 |
| | | | | 370/252 |
| 2012/0099587 | A1* | 4/2012 | Fan | H04L 45/123 |
| | | | | 370/389 |

* cited by examiner

*Primary Examiner* — Anh Ngoc M Nguyen
(74) *Attorney, Agent, or Firm* — Gennadiy Vinokur; Hironori Tsukamoto

(57) ABSTRACT

A node device for forming a multi-hop network is provided. The node device is configured to avoid interference from coexisting interfering networks and includes a transceiver configured to receive and transmit data with respect to a Destination Oriented Directed Acyclic Graph (DODAG) Information Object message (DIO message), a memory configured to store computer executable programs including an interfered-node count (IC), single-rate link count (SLC), multi-rate link count (MLC), hop count (HP), path communication latency (PCL) and an interference efficient and multi-rate supported routing program CoM-RPL, and a processor configured to perform steps of the computer executable programs. The steps include determining if the received DIO message indicates a new DODAG or an existing DODAG. In this case, if a determined result in the determining indicates the new DODAG and no single-rate link and no interfered node on a path of multi-hop network, the node device joins DODAG network and the processor selects a sender of the DIO message as a default parent, computes a rank for itself, updates DIO message with its rank, IC, SLC, TRM, HP, PCL and transmits scheduled DIO messages based on transmission rate mode.

21 Claims, 10 Drawing Sheets

(51) Int. Cl.
*H04W 40/28* (2009.01)
*H04L 45/48* (2022.01)
*H04L 45/02* (2022.01)
*H04L 45/12* (2022.01)

(52) U.S. Cl.
CPC ............ *H04L 45/124* (2013.01); *H04L 45/48* (2013.01); *H04W 40/18* (2013.01); *H04W 40/28* (2013.01)

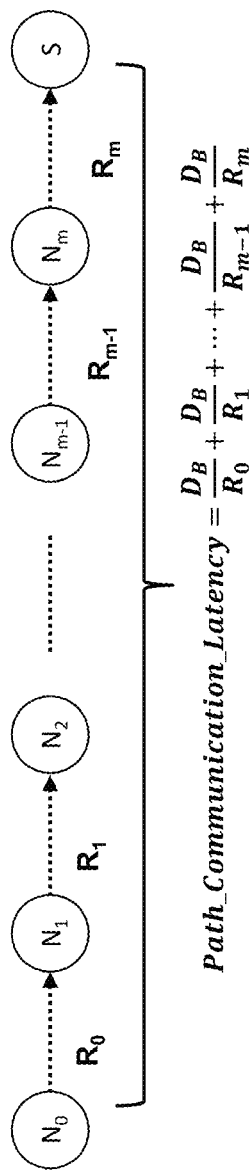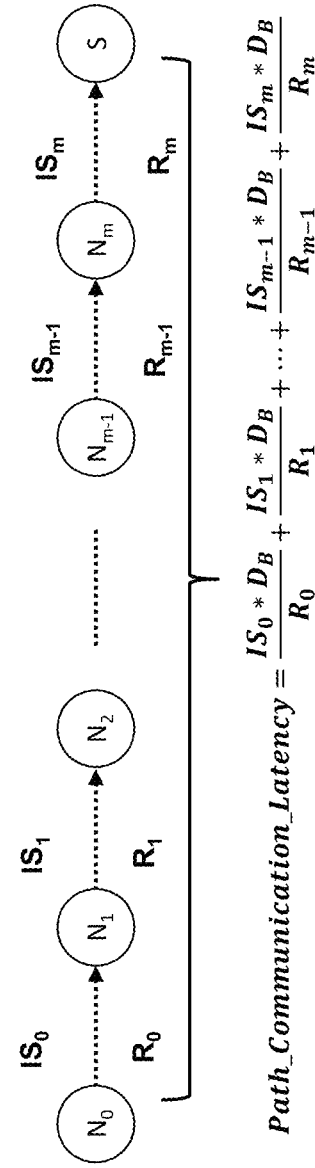

B: BLEnDer
W: Wi-SUN FAN
B/W: Hybrid of BLEnDer and Wi-SUN FAN

ROUTING DATA IN WIRELESS NETWORK THAT COEXISTS WITH INTERFERING WIRELESS NETWORKS

FIELD OF THE INVENTION

This invention relates generally to a routing data method or system in wireless communication networks, and particularly to a wireless communication network that coexists with interfering wireless networks.

BACKGROUND OF THE INVENTION

Internet of Things (IoT) and machine-to-machine (M2M) applications have been rapidly growing. A broad range of wireless communication technologies have been developed to cater the diverse applications. IEEE 802.11ah and IEEE 802.15.4g are two commonly referred standards developed for IoT applications. Both 802.11ah and 802.15.4g are designed to operate in Sub-1 GHz (S1G) band for outdoor IoT applications while 802.15.4g can also operate at 2.4 GHz band. When co-located 802.11ah and 802.15.4g networks operate on overlapped frequency band, one network becomes an interfering network to another network. The problem is that one network does not know the existence of another network because they cannot communicate. As heterogeneous wireless technologies are emerging, interference among the networks using different communication technologies becomes critical issue to be addressed in routing data packet.

The existing routing protocols such as Routing Protocol for Low-power and lossy networks (RPL) have been designed to route data in a wireless network without considering interferences, i.e., the network is deployed at a location where no other wireless network is installed. In this case, all devices use the same communication technology. As a result, the neighboring devices can communicate with each other even they may have different resources and capabilities, e.g., some devices may be battery powered and other devices may be mains powered, some devices may have larger memory and other devices may have smaller memory. An advantage of routing data in such network is that neighboring devices can coordinate to achieve the best performance, e.g., devices can use "Request To Send"/"Clear To Send" (RTS/CTS) mechanism to reduce data collisions.

However, in the case of coexisting wireless networks, there are at least two wireless networks being co-located using different communication technologies. If these networks use overlapping frequency band, they coexist and interfere with each other. Due to the use of different communication technologies, devices in one network cannot communicate with devices in another network. As a result, the networks cannot use the RTS/CTS mechanism because the RTS packet in one network is not readable in another network. Therefore, routing data in coexisting wireless networks is much more challenging. The conventional routing protocols may not work well in a wireless network that coexists with other wireless networks due to inefficient routing path selection, which may cause heavy data loss and/or long data delay. Heavy data loss and long data latency are not acceptable for applications such as security and monitoring.

FIG. 2A shows an example, in which conventional routing protocols will select a routing path with heavy data loss, which results in an unreliable network. One multi-hop wireless network, e.g. 802.15.4g network, consists of sink node S, data nodes A, B, C and D. An interfering network, e.g. 802.11ah network, consists of nodes E and F. For node D to select a routing path to sink S, the conventional routing protocols will select D→B→S instead of D→C→A→S, because path D→B→S is shorter than path D→C→A→S. However, in this case, there is an interfering network such that the communication link between nodes E and F interferes with communication link between node B and sink S. If E and F have heavy communication, node B can hardly send data to sink S because interfering nodes such as 802.11ah nodes are much more aggressive than wireless nodes such as 802.15.4g nodes in terms of channel access contention. As a result, node D should select longer path D→C→A→S instead.

In addition, multi-rate devices are emerging. A multi-rate device can transmit data with different transmission rates, e.g., 100 kbps and 200 kbps. Using lower transmission rate, communication range is longer, which results in shorter routing path. Using higher transmission rate, communication range is shorter, which results in longer path. However, a shorter lower transmission rate path may have longer latency in delivering data than a longer higher transmission rate path. For time critical applications, the long latency is not acceptable. Conventional routing protocols do not take multi-rate feature into account. As a result, the selected path may cause more delay.

FIG. 3 shows an example, in which conventional routing protocols select a longer delay routing path. The network consists of sink node S, data nodes X, Y, Z and W. For data node W to select a routing path to sink S, conventional routing protocol will select W→Z→S instead of W→Y→X→S because path W→Z→S is shorter than path W→Y→X→S. However, in this case, the path W→Z→S is a lower transmission rate path, on which transmission rate between each link is 100 kbps. This lower transmission rate path takes 0.016 second to deliver 100 bytes data from node W to sink S. On the other hand, path W→Y→X→S is a higher transmission rate path, on which transmission rate between each link is 200 kbps. This higher transmission rate path only needs 0.012 second to deliver 100 bytes data from node W to sink S. Therefore, node W should select longer path W→Y→X→S instead.

Accordingly, it is desirable to provide new routing methods that consider both interfering networks and multi-rate capability of the network devices.

SUMMARY OF THE INVENTION

Some embodiments of the invention are based on recognition that routing is needed in a multi-hop wireless network, in which at least one data node cannot directly communicate with the sink node. According to some embodiments of the present invention, a multi-hop wireless network can coexist with multiple other wireless networks that are referred to as interfering networks. An interfering network can be a single hop network, i.e., star network, or multi-hop network.

One object of various embodiments of the invention is to provide a method for efficiently routing data in a multi-hop wireless network that coexists with other interfering wireless networks using different communication technologies. In some cases, the network has at least one sink node and data nodes including single-rate nodes (SRNs) and multi-rate nodes (MRNs). Each node may be referred to as a node device.

According to some embodiments of the present invention, a node device for forming a multi-hop network is provided. The multi-hop network is configured to avoid interference from coexisting interfering networks. In this case, the node device may include a transceiver configured to receive and transmit data with respect to a Destination Oriented Directed Acyclic Graph (DODAG) Information Object message (DIO message); a memory configured to store computer executable programs including an interfered-node count (IC), single-rate link count (SLC), multi-rate link count (MLC), hop count (HP), path communication latency (PCL) and an interference efficient and multi-rate supported routing program CoM-RPL; and a processor configured to perform steps of the computer executable programs, wherein the steps comprise: determining if the received DIO message indicates a new DODAG or an existing DODAG, wherein if a determined result in the determining indicates the new DODAG and no single-rate link and no interfered node on a path of multi-hop network, the node device joins DODAG network and the processor selects a sender of the DIO message as a default parent, computes a rank for itself, updates DIO message with its rank, IC, SLC, TRM, HP, PCL and transmits scheduled DIO messages based on transmission rate mode, if the path contains single-rate node or/and interfered node, the processor selects the sender of the DIO message as parent and starts a DIO waiting timer to wait for better paths, wherein timer is up, the node device joins network, selects a default parent with the minimum communication path latency (CPL) and transmits the updated DIO message.

Further, some embodiments can provide a computer-executable method that is provided as computer-executable programs that can cause a processor to perform steps: determining if the received DIO message indicates a new DODAG or an existing DODAG, wherein if a determined result in the determining indicates the new DODAG and no single-rate link and no interfered node on a path of multi-hop network, the node device joins DODAG network and the processor selects a sender of the DIO message as a default parent, computes a rank for itself, updates DIO message with its rank, IC, SLC, TRM, HP, PCL and transmits scheduled DIO messages based on transmission rate mode, if the path contains single-rate node or/and interfered node, the processor selects the sender of the DIO message as parent and starts a DIO waiting timer to wait for better paths, wherein timer is up, the node device joins network, selects a default parent with the minimum communication path latency (CPL) and transmits the updated DIO message.

It is another object of some embodiments to provide a low latency routing mechanism for transmitting packets in a multi-hop manner in which at least one data node exchanges the packets with the sink node through at least one intermediate data node relaying the packets between the data node and the sink node. Additionally, or alternatively, it is an object of some embodiments of the invention to provide a distributed interference estimation method for network devices to measure the severity of the interference.

Some embodiments of the invention are based on recognition that interference mitigation can be divided into two categories: active approach and passive approach. Using active approach, a device actively controls its transmission to reduce interference with other networks, e.g., Carrier Sense Multiple Access/Collision Avoidance (CSMA/CA) is an active interference mitigation method. Using passive approach, a device passively reacts when it detects the interference from other networks. IEEE 802.11 standard family and IEEE 802.15.4 standard family use CSMA/CA method. Therefore, passive interference mitigation method needs to be developed for coexisting wireless networks.

Some embodiments of the invention are based on recognition that interference mitigation can be divided into coordinated approach and distributed approach. However, the coordination among interfering networks is not available because devices using different communication technologies cannot communicate with each other. For example, an 802.15.4g device cannot communicate with an 802.11ah device. As a result, the coordinated interference mitigation approach does not apply because a device does not know when devices in other networks transmit. Therefore, distributed interference mitigation method needs to be developed for coexisting wireless networks.

Accordingly, some embodiments of the invention provide a distributed passive interference mitigation method for coexisting wireless networks, in which a distributed passive interference metric is provided to measure the severity of the interference so that neighboring nodes do not select a highly interfered node as relay node.

Additionally, or alternatively, some embodiments are based on a realization that the interference efficient routing of the data packets from a particular data node to the sink node should be via the routing path with lower interference. For example, some embodiments provide a method/device/ system to transmit the data packets along a routing path with the smaller number of the interfered nodes. Further, one embodiment provides a method/system that determines an interference severity metric to locate an interference efficient routing path. The interference severity metric can include one or combination of interfering energy detection, the interfered channel access failure and the interfered channel occupancy.

Some embodiments of the invention are based on recognition that the multi-rate devices can be present in a wireless network. A high transmission rate link takes less time to transmit a data packet than a low transmission rate link does. However, the communication range of a low transmission rate link is longer than that of a high transmission rate link. Some embodiments provide a method/system that can determine a routing path that minimizes the total latency.

Additionally, or alternatively, some embodiments provide a method/device/system that can determine routing path based on one or combination of a number of the interfered nodes, a number of single-rate nodes and a number of multi-rate nodes to minimize the total delay for data delivery.

Additionally, the present invention provides a coexistence and multi-rate capable Routing Protocol for Low-power and lossy networks (RPL) called CoM-RPL.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4A illustrates path communication latency computation without interfering network;

FIG. 4B depicts path communication latency computation with interfering network;

Figure 1:
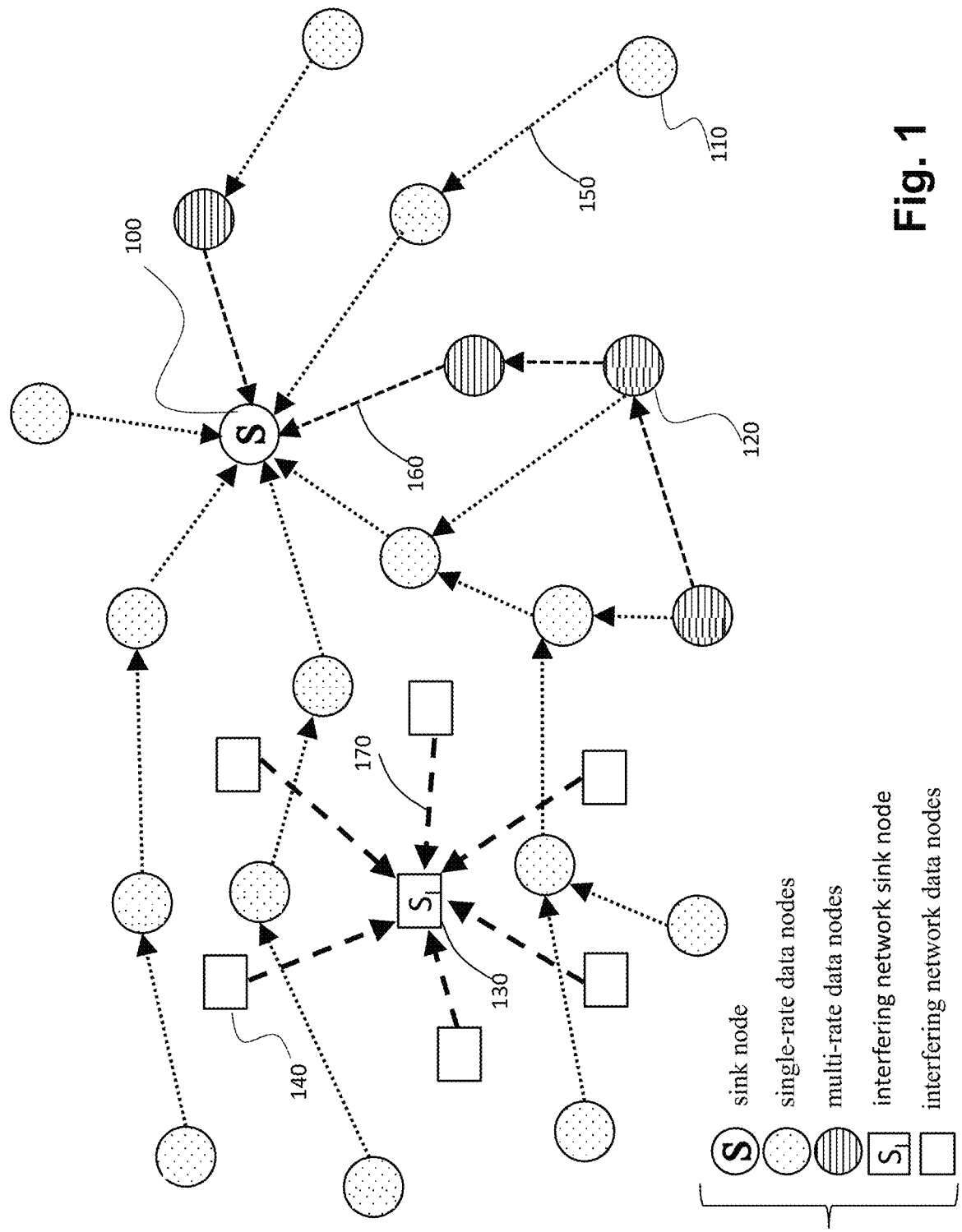
FIG. 1 is a schematic illustrating a system consisting of a multi-hop wireless network that coexists with an interfering network.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1 shows a system consisting of a multi-hop wireless network that coexists with an interfering network. FIG. 1 shows a schematic illustrating an example of a multi-hop wireless network, e.g. 802.15.4g network, which coexists with an interfering network, e.g. 802.11ah network. In the figure, the circles represent nodes in multi-hop wireless network that includes a sink node S 100, single-rate nodes (SRNs) 110 and multi-rate nodes (MRNs) 120. The nodes form a wireless mesh network, where the general flow of data packets is from the data nodes (single-rate nodes or multi-rate nodes) to sink node S, although control messages can be sent in either direction. A single-rate node transmits with only one transmission rate called single transmission rate. A single-rate node communicates with another single-rate node or multi-rate node or sink node S using communication link 150. However, a multi-rate node can transmit with multiple transmission rates. Besides the single transmission rate is used by single-rate node, a multi-rate node can also transmits using other transmission rates, which are usually higher than single transmission rate. A multi-rate node communicates with a single-rate node using communication link 150. A multi-rate node communicates with another multi-rate node or sink node S using communication link 160. The sink node is considered as a multi-rate node. Besides the multi-hop wireless network, FIG. 1 also includes an interfering network. The squares represent nodes in interfering network, e.g. 802.11ah network. The interfering network includes an interfering network sink node ($S_I$) 130 and interfering network data nodes 140. The data nodes 140 and sink node 130 in interfering network communicate using communication link 170.

The multi-hop wireless network can include more than one sink node and an interfering network can also be a multi-hop network, which are not shown in FIG. 1.

In the multi-hop wireless network, data packets are exchanged between the sink node and the data nodes in a multi-hop manner such that there is at least one data node exchanging the packets with the sink node through at least one intermediate data node relaying the packets between the data node and the sink node. In other words, data collection is conducted in a multi-hop manner. Due to the existence of interfering network and multi-rate nodes, a routing method must be provided to efficiently route data packets from node nodes that cannot directly communicate with any sink nodes by considering the severity of the interference and availability of multi-rate nodes.

Distributed Interference Severity Estimation

Various embodiments of the present disclosure are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Depending on node deployment in multi-hop wireless network and interfering network, some nodes may have no interfering node in their neighborhoods and other nodes may have interfering node in their neighborhoods. Therefore, the interference measurement should be done by each node in a distribution way.

The nodes in different wireless networks cannot communicate with each other. Therefore, multi-hop network and interfering network cannot be coordinated. As a result, the nodes in the interfering network are not able to perform coordinated interference reduction. Furthermore, active approaches such as CSMA/CA do not provide the required interference mitigation performance, especially in large size wireless networks such as smart meter networks. Therefore, the nodes in multi-hop wireless network need to perform passive interference reduction, which indicates that passive interference measurement method is needed.

The interfering energy detection ratio (IEDR) is a metric that can be used by nodes in multi-hop wireless network to measure the severity of the interference. Using energy detection mechanism, a node in multi-hop wireless network can detect a signal energy level that is higher than or equal to its energy detection (ED) threshold. Let $ED_t$ be the total number of such detections by a node within a time period T. Using its carrier sensing mechanism, a node in multi-hop wireless can determine if the detected signal is a signal transmitted by another node in multi-hop wireless network or not. If not, the signal is either interfering signal or collided signal. This signal is considered as interfering signal. Let $ED_i$ be the number of the interfering signals detected within time period T, the interfering energy detection rate (IEDR) can be defined as $$IEDR = \frac{ED_i}{ED_t} \quad (1)$$

The interfered channel access failure rate (ICAFR) can also be a metric used by node in multi-hop wireless network to measure the severity of the interference. Some wireless technologies such as IEEE 802.11 and IEEE 802.15.4 use Carrier Sense Multiple Access/Collision Avoidance (CSMA/CA) for channel access. CSMA/CA mechanism provides a feature called channel access failure. Let $N_{Caf}$ be the total number of channel access failure observed by a node in multi-hop wireless network for total $N_{tx}$ transmission attempts. $N_{Caf}$ can be decomposed into $N_{Caf} = N_i + N_m$, where $N_i$ is the number of channel access failure caused by interfering network transmission and $N_m$ is the number of channel failure caused by multi-hop wireless network transmission. A node (node device) in multi-hop wireless network can compute $N_m$ by using its carrier sense mechanism. Therefore, the interfered channel access failure rate (ICAFR) can be defined as $$ICAFR = \frac{N_{caf} - N_m}{N_{tx}} \quad (2)$$

The interfered channel occupancy ratio (ICOR) is another metric that can be used by node in multi-hop wireless network to measure the severity of the interference. A node in multi-hop wireless network can estimate the channel busy time $T_b$ by continuously sensing channel for a time period T. If the node also makes transmission or reception within the time period T, its transmission time and reception time are considered as busy time, and its turnaround time is considered as idle time. Furthermore, a node in multi-hop wireless network can determine the channel busy time $T_m$ consumed by the multi-hop wireless network transmissions via carrier sense. In other words, $T_b$ is total busy time, which can be time used by interfering network and the time used by multi-hop network. Further, $T_m$ is time used by multi-hop network only. Therefore, the interfered channel occupancy ratio (ICOR) can be defined as $$ICOR = \frac{T_b - T_m}{T} \quad (3)$$

There can be other passive interference measurement methods that can be used by node in multi-hop wireless network to measure the severity of the interference.

It can be seen that $0 \leq IEDR \leq 1$ because of $0 \leq ED_i \leq ED_t$, $0 \leq ICAFR \leq 1$ because of $0 \leq N_m \leq N_{Caf} \leq N_{tx}$, and $0 \leq ICOR \leq 1$ because of $0 \leq T_m \leq T_b \leq T$. For IEDR, ICAFR and ICOR, value 0 indicates no interference and value 1 indicates the highest interference such that the neighborhood of the observing node in multi-hop wireless network cannot transmit.

New Routing Metrics

Figure 2A:
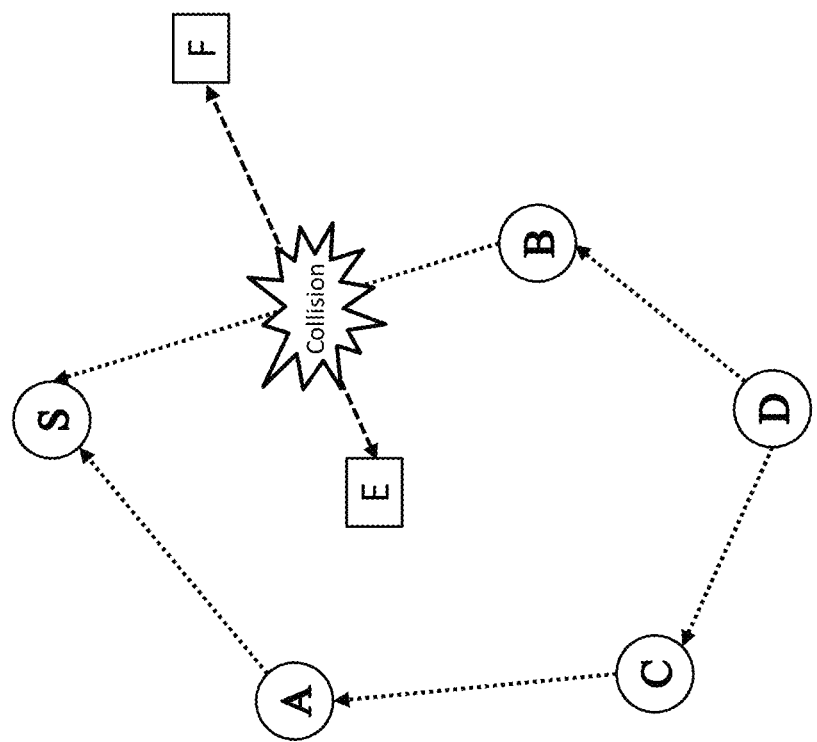
FIG. 2A shows an example in which conventional routing protocols ignore the interfering network and therefore, select a routing path with high packet loss rate.
Figure 3:
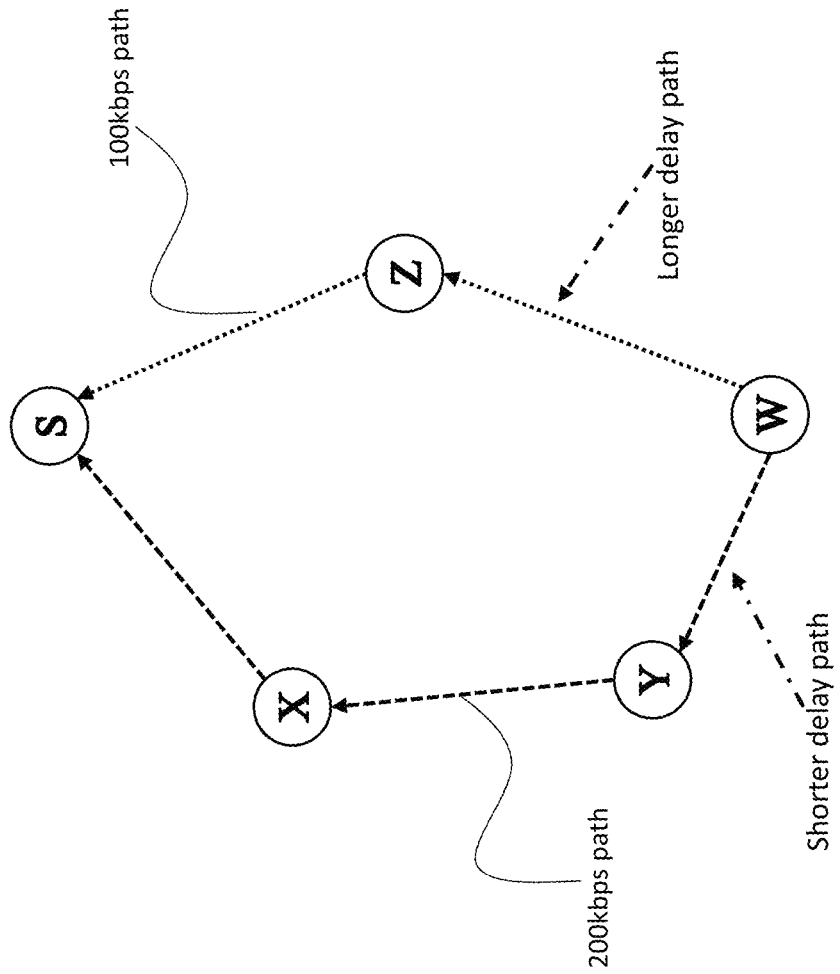
FIG. 3 shows an example in which conventional routing protocols ignore multi-rate capability and therefore, select a routing path with longer latency.

For routing data packet in wireless networks, there are conventional routing metrics that can be divided into two categories, node state metrics, e.g. hop count and node energy level, and link metrics, e.g. link quality and expected transmission count (ETX). These conventional routing metrics are designed for routing data packet in a wireless network that does not coexist with other wireless networks and includes single-rate nodes only. FIG. 2A shows that the hop count does not work well in the presence of interfering networks and FIG. 3 illustrates that the hop count does not work well in the presence of multi-rate nodes. Therefore, new routing metrics need to be provided to take interference and multi-rate transmission into account.

The interference severity (IS) is a metric to be provided. The IS can be defined using one or combination of IEDR, ICAFR and ICOR. Following is one of definitions.

$$IS = 1 + \frac{x}{1-x} \quad (4)$$

where x can be one of IEDR, ICAFR and ICOR. It can be seen that $IS \geq 1$ because of $0 \leq x \leq 1$. For no interference, i.e. $x=0$, $IS=1$. As x approaches 1, i.e., the highest interference, IS goes to infinite.

A threshold $IS_{th}$ can be defined for a multi-hop wireless network that coexists with other interfering wireless networks. A node in multi-hop wireless network computes the IS. If $IS \geq IS_{th}$, then this node is considered as an interfered node. If $IS < IS_{th}$, then this node is considered as non-interfered node.

For routing path discovery, the interfered-node count (IC) is a metric to compute the number of interfered nodes on a routing path. A routing path with smaller IC consists of less interfered nodes and a routing path with larger IC consists of more interfered nodes. During routing path discovery process, the IC is set to 0 by the sink node. A data node increases IC by 1 if its computed $IS \geq IS_{th}$.

Transmission rate mode (TRM) is a metric to indicate the number of transmission rates a node is capable to use. TRM=1 indicates the single-rate node, TRM=2 indicates the two-rate node, TRM=3 indicates the three-rate node and so on so forth. Without loss of generality, it can be assumed that a single-rate node transmits data using the lowest transmission rate, a two-rate node can transmit data using the lowest transmission rate or a rate higher than the lowest transmission rate, a three-rate node can transmit data using either rate used by two-rate node or a higher rate, and so on so forth. Therefore, nodes in a network can be divided into single-rate nodes, two-rate nodes, three-rate nodes and so on so forth. The present invention uses two-class case of nodes, i.e., single-rate nodes and multi-rate nodes, to illustrate the concept of invention, where multi-rate nodes include two-rate nodes, three-rate nodes, etc. The three-class case, four-class case, etc. work similarly.

Single-rate link count (SLC) is a metric to compute the number of single-rate links on a routing path. A routing path with smaller SLC consists of less single-rate nodes and a routing path with larger SLC consists of more single-rate nodes. However, the SLC does not represent the number of single-rate nodes on a routing path. Sink node is considered as a multi-rate node. At sink node, the SLC is set to 0. During route discovery process, a node increases SLC by 1 if it is a single-rate node or its next hop node (parent) is a single-rate node.

Multi-rate link count (MLC) is a metric to compute the number of multi-rate links on a routing path. A routing path with smaller MLC consists of less multi-rate nodes and a routing path with larger MLC consists of more multi-rate nodes. Similar, the MLC does not represent the number of multi-rate nodes on a routing path. At sink node, the MLC is set to 0. During route discovery process, a node increases MLC by 1 if it is a multi-rate node and its next hop node (parent) is also a multi-rate node.

It can be seen that for a routing path, hop count=SLC+MLC because each hop is either single-rate link or multi-rate link.

Path communication latency (PCL) is a metric to compute communication latency on a path. Assume that without interference, a packet does not need retransmission at each link on a routing path.

FIG. 4A shows a way to compute communication latency for a routing path in multi-hop wireless network that supports multi-rate nodes. For a routing path from data node $N_0$ to sink node S, there are m relay nodes $N_1, N_2, \ldots, N_{m-1}$ and $N_m$. Assume $R_0, R_1, \ldots, R_{m-1}$ and $R_m$ are link transmission rates, respectively. To deliver $D_B$ bits data from node $N_0$ to sink S, PCL is computed as $$PCL = \frac{D_B}{R_0} + \frac{D_B}{R_1} + \ldots + \frac{D_B}{R_{m-1}} + \frac{D_B}{R_m} \quad (5)$$

However, in the presence of interfering wireless networks, packet retransmission and pack loss occur. Therefore, PCL becomes longer. FIG. 4B shows a way to compute communication latency for a routing path in multi-hop wireless network with both multi-rate nodes and interfering networks. Assume $IS_0, IS_1, \ldots, IS_m$ is the interference severity at node $N_0, N_1, \ldots, N_m$, respectively. In this case, to deliver $D_B$ bits data from node $N_0$ to sink S, the PCL can be computed as $$PCL = \frac{IS_0 * D_B}{R_0} + \frac{IS_1 * D_B}{R_1} + \ldots + \frac{IS_{m-1} * D_B}{R_{m-1}} + \frac{IS_m * D_B}{R_m} \quad (6)$$

It can be seen that PCL in (6) is greater than PCL in (5) since $IS_i \geq 1$ (i=0, 1, ..., PCL is set to 0 at sink node S. During route discovery process, a node adds its link communication latency to PCL based on its interference severity and link transmission rate.

RPL Overview

To design a scalable routing protocol for IoT applications, the Internet Engineering Task Force (IETF) has developed Routing Protocol for Low-power and lossy networks (RPL). The RPL organizes nodes in a network as a Directed Acyclic Graph (DAG) and partitions the DAG into one or more Destination Oriented DAGs (DODAGs). There is one DODAG per data sink. To construct the topology of the DODAG and upward routes from nodes to a data sink, the data sink acts as the root of the DODAG and broadcasts DODAG Information Object (DIO) messages to neighboring nodes. DIO messages contain the information to construct the DODAG. For example, three parameters of RPLInstanceID, DODAGID and DODAGVersionNumber are enclosed to identify a DODAG version.

The rank of a node defines the individual position of the node relative to other nodes with respect to the root of the DODAG. Nodes in the proximity of the data sink receive the DIO messages, determine their ranks when the nodes decide to join the DODAG, and transmit updated DIO messages to neighboring nodes. The ranks of the nodes are contained in the DIO messages. DIO messages are propagated in all directions so that the DODAG topology is constructed in a wave front manner, until every node joins a DODAG. RPL uses Destination Advertisement Object (DAO) messages to build downward routes from data sink to other destinations.

The DAO messages are transmitted upwards from nodes to their parents or to the root. The DODAG Information Solicitation (DIS) message is used to solicit a DIO from an RPL node, that is, to discover new routes.

To achieve reliable routing, RPL allows a node to have multiple parents using the DODAG structure for determining the next hop for data packet forwarding. One of parents is selected as the preferred (default) parent and others as backup parents. The preferred parent is used as default next hop for packet forwarding. If the preferred parent is unavailable, then the backup parents can be used. RPL uses Objective Functions (OF) for assisting nodes to determine ranks and select parents.

DIO Message Broadcast in Multi-Hop Wireless Network with Multi-Rate Node

Unlike conventional RPL that does not consider multi-rate node, the present invention provides a new method to transmit the DIO message.

To consider the interference and multi-rate node, besides conventional DIO parameters such as hop count and rank, new parameters IC, TRM, SLC and PCL need to be carried in DIO message. IC and SLC are used by a node without parent to select default parent when the node receives the DIO message, TRM is used to update SLC, PCL is used to select default parent by the node received multiple DIOs. IS, which does not need to be carried in DIO, and $IS_{th}$ are used to update IC.

The route discovery becomes more complicated due to the presence of multi-rate node. A multi-rate node can transmit packet using different transmission rate. To make sure all neighbors receive its DIO message, a multi-rate node needs to transmit DIO message using all transmission rates, e.g. a two-rate node needs to transmit route discovery message twice, one with lower transmission rate and one with higher transmission rate. A DIO transmitted using a lower transmission rate can be received by more neighbors due to the longer communication range and a DIO transmitted using higher transmission rate can be received by less neighbors due to the shorter communication range. Therefore, the routing topology, i.e. DODAG, constructed is different from conventional routing topology, which is constructed using a single transmission rate.

Once route is discovered, a node knows TRM of next hop node (parent) and therefore, can select an appropriate rate to transmit data packet.

Network Topology Construction in a Multi-Hop Wireless Network with Interfering Wireless Networks and Multi-Rate Nodes Existing routing protocols are not designed for wireless network including both single-rate nodes and multi-rate nodes and coexisting with other wireless networks. New routing methods must be introduced.

Take RPL for example, RPL doesn't support multi-rate nodes and doesn't consider the interfering wireless networks. To support interference mitigation and multi-rate nodes, besides the conventional routing metrics defined by RPL, new metrics PCL, IC, TRM and SLC must be carried in DIO message. With these metrics, many ways can be used as criteria to select parents and compute rank, i.e., to construct network topology DODAG. The interference efficient routing methods with support of multi-rate nodes are provided in following paragraphs.

RPL uses DIO message propagation to discover upward routing paths. DIO message is originated by a sink node. During DIO propagation, each node selects one default parent and multiple backup parents if these backup parents are available.

Figure 5:
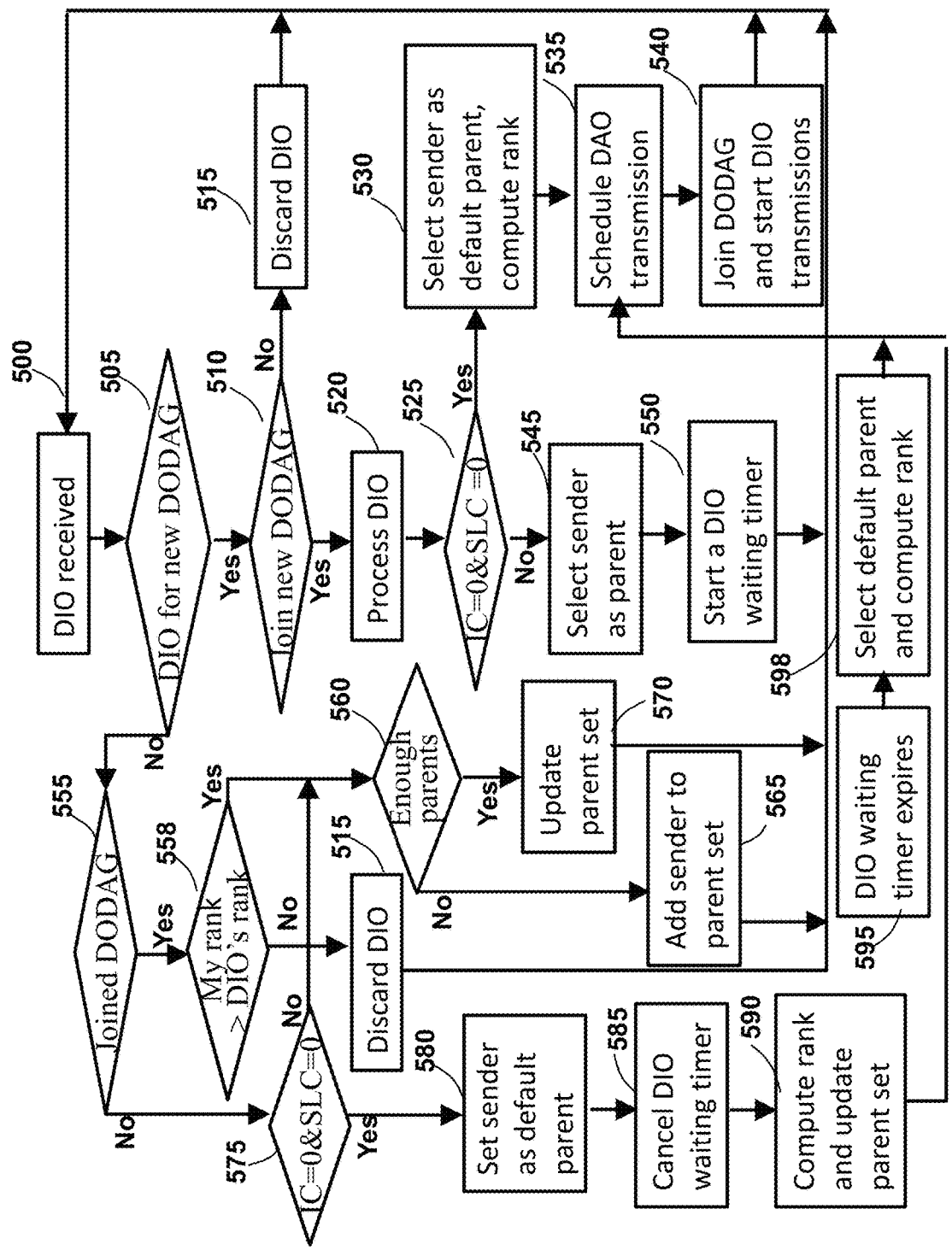
FIG. 5 shows block diagram of routing path discovery, according to some embodiments of an invention.

FIG. 5 shows block diagram of routing path discovery according to some embodiments of an invention.

The figure shows RPL with provided routing path discovery method supporting newly introduced interference efficient routing metric and multi-rate supported routing metrics.

A network device or a sensor disposed in a node included a multi-hop wireless network is configured to compute a rank of the node.

When a node in multi-hop wireless network receives a DIO message in step 500, the node checks in step 505 if this DIO message is for a new DODAG or existing DODAG.

If the DIO message is for a new DODAG (not for existing DODAG), the node decides in step 510 whether the node joins the new DODAG or not. If the node doesn't join the new DODAG, the DIO message is discarded in step 515. If the node decides to join the new DODAG, the DIO message is processed in step 520. If both IC and SLC are zero in step 525 (path contains no interfered node and no single-rate node), the node selects the DIO sender as its default parent in step 530, computes its rank using equation (9) and updates DIO message with my rank, IC, etc., schedules a DAO transmission in step 535, and starts to broadcasting the DIO message in step 540. If the node is a multi-rate node, the DIO message is broadcasted multiple times. If either IC or/and SLC is not zero, the node selects the DIO sender as a parent in step 545, but the node doesn't compute rank. Instead, the node starts a timer in step 550 to wait for more preferred DIOs. During waiting time period, the node continues receiving DIO messages, processing DIO messages and updating its parent set. When the waiting timer expires in step 595, the node selects one parent from parent set as default parent using equation (8), computes its rank based on equation (9) in step 598, updates the DIO message, schedules a DAO transmission in step 535 and starts the DIO message transmissions in step 540.

If the received DIO message by the node is from an existing DODAG, it indicates that the node has selected at least one parent already. Therefore, the node checks in step 555 if it has joined the DODAG. If yes (the rank is computed), the node checks the computed rank in step 558 if my rank is greater the rank of DIO sender. If no (my rank is not greater than the rank of DIO sender), the received DIO is discarded in step 515. If yes (my rank is greater than the rank of DIO sender), the node checks in step 560 if enough parents are selected. If no (enough parents are not selected), the node adds in step 565 the DIO sender to its parent set. If yes (enough parents are selected), the node updates in step 570 its parent set by replacing one of the parents if this DIO contains a better routing path. If the rank is not computed in step 555 and if this DIO message has both IC and SLC are equal to zero in step 575, the node sets the DIO sender as default parent in step 580, and the node cancels the DIO waiting timers in step 585. The node computes its rank using equation (9) and updates parent set by replacing one of existing parents in step 590, updates the DIO message, and the node further schedules a DAO transmission in step 535 and starts broadcasting the DIO transmission in step 540. If the node is a multi-rate node, the DIO message is broadcasted multiple times. If the DIO message has an IC>0 or/and SLC>0 (No in step 575), the node checks if enough parents are selected in step 560. If the check result indicates that enough parents are not selected, the node adds the DIO sender to its parent set in step 565. If the check result in step 560 indicates that enough parents are selected, the node updates its parent in step 570 by replacing an existing parent with the DIO sender if the DIO sender provides a better routing path.

In order to update parent set in step 570, criteria need to be defined to determine that one path is better than another path. There are different ways to define that one path is better than another path. A path with shorter communication latency is considered better than a path with longer communication latency if other metrics are similar. A path with smaller IC is considered better than a path with larger IC if other metrics are similar. A path with smaller SLC is considered better than a path with larger SLC if other metrics are similar. A path with greater MLC is considered better than a path with smaller MLC if other metrics are similar.

When DIO timer expires, a node selects default parent based on the path communication latency (PCL). Assume a node has selected K parents $P_k$ (k=1,2, ..., K). For each parent $P_k$, the PCL is given by $$PCL_k = \frac{IS_0^k * D_B}{R_0^k} + \frac{IS_1^k * D_B}{R_1^k} + \ldots + \frac{IS_{m_k-1}^k * D_B}{R_{m_k-1}^k} + \frac{IS_{m_k}^k * D_B}{R_{m_k}^k} \qquad (7)$$

The node selects a parent with the minimum PCL as default parent, i.e., default parent $P_k$ satisfies $$PCL_k = \forall_{i \in [1,2, \ldots, K]} \min PCL_i \qquad (8)$$

Notice that in the network topology construction process, $D_B$ is same at each hop and therefore, can be typically set to 1. PCL updating starts from sink node, which sets PCL=0. The updating propagates along the routing path. Once a node selects its default parent, the link transmission rate R is determined. Therefore, the node computes its IS using equation (4) and adds $IS*D_B/R$ to the PCL received from its default parent, i.e., PCL=PCL+$IS*D_B/R$. The updated PCL is then transmitted in the DIO message.

Figure 2B:
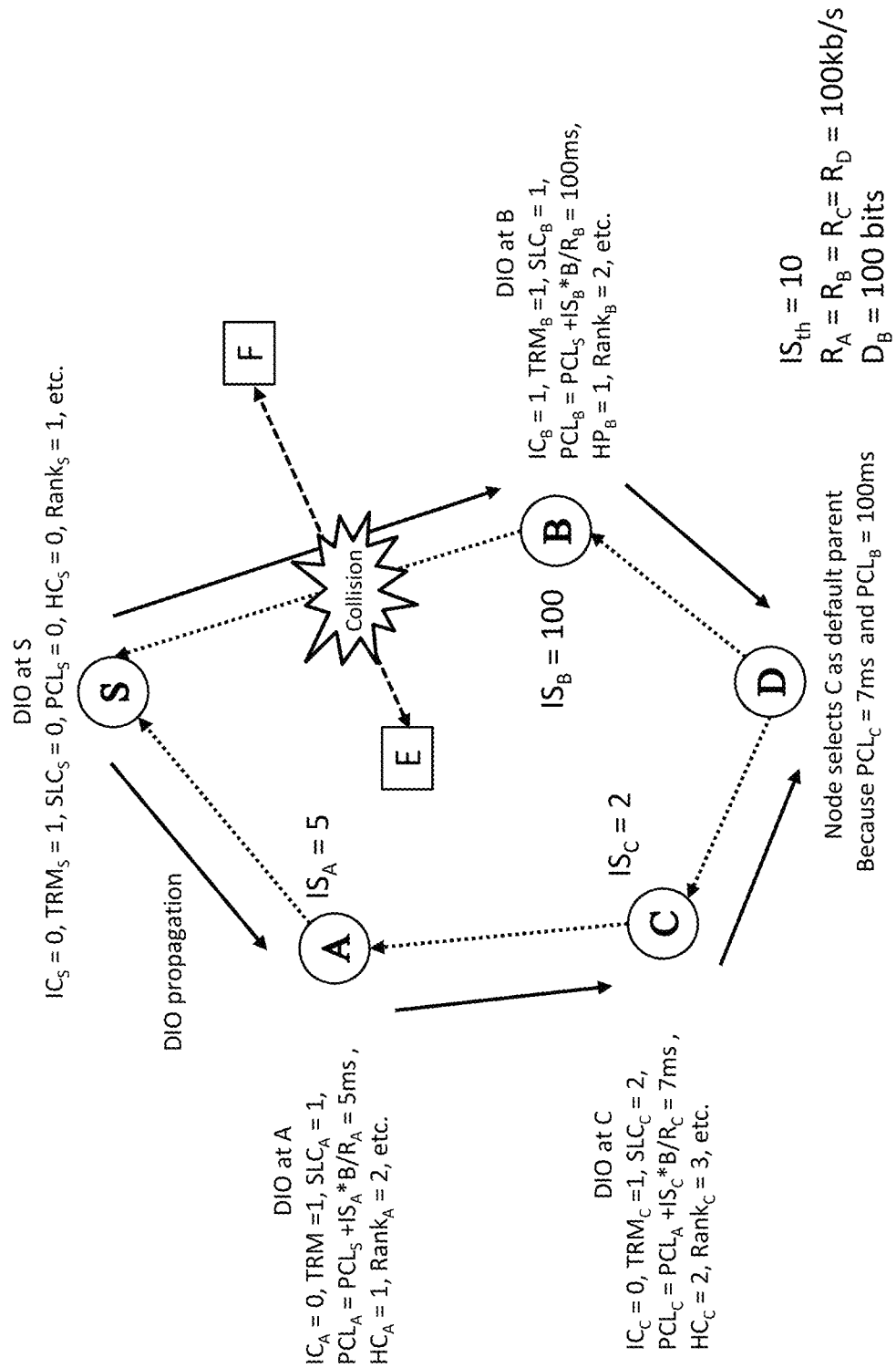
FIG. 2B shows an example of DIO information updating and default parent selection in a single rate network.

FIG. 2B shows an example of PCL updating for a single rate network, in which sink node S sets $IC_S$=0, $TRM_S$=1, $SLC_S$=0, $PCL_S$=0, $HP_S$ (hop count)=0, $Rank_S$=1, etc. When node A receives DIO message from sink node S, it joins network and computes its ISA=5 that is less than threshold $IS_{th}$=10, therefore, node A is not an interfered node. As a result, node A sets $IC_A$=$IC_S$+0=0, $TRM_A$=1, $SLC_A$=$SLC_S$+1=1, $PCL_A$=$PCL_S$+$D_B/R_A$=5 ms, $HP_A$=$HP_S$+1=1, $Rank_A$=2, etc. Similarly, when node C receives DIO from node A, it joins network and computes its $IS_C$=2 that is less than threshold $IS_{th}$=10, therefore, node C is not an interfered node. As a result, node C sets $IC_C$=$IC_A$+0=0, $TRM_C$=1, $SLC_C$=$SLC_A$+1=2, $PCL_C$=$PCL_A$+$D_B/R_C$=7 ms, $HP_C$=$HP_A$+1=2, $Rank_C$=3, etc. On the other hand, when node B receives DIO message from sink node S, it also joins network and computes its $IS_B$, but in this case, interfering network has node E and node F with heavy data transmission. Therefore, node has high $IS_B$=100 that is greater than threshold $IS_{th}$=10, therefore, node B is an interfered node. As a result, node B sets $IC_B$=$IC_S$+1=1, $TRM_B$=1, $SLC_B$=$SLC_S$+1=1, $PCL_B$=$PCL_S$+$D_B/R_B$=100 ms, $HP_B$=$HP_S$+1=1, $Rank_B$=2, etc.

When node D receives DIO messages from node C and node B, it sees $PCL_C$=7 and $PCL_B$=100. Therefore, node D selects node C as default parent even path D→C→A→S is longer than path D→B→S. Other parameters such as TRM and SLC can be used for tie break.

With conventional and new routing metrics, there are many ways to compute a rank for a node. Following is a rank computation method incorporates four new metrics into conventional rank computation:

$$R = R_D + R_I + C_{IC} * IC + C_{SLC} * SLC + C_{MLC} * MLC + C_{TRM} * TRM, \quad (9)$$

where $R_D$ is the rank of default parent, $R_I$ is the rank increase computed by using conventional RPL routing metrics and object functions, $C_{IC}$, $C_{SLC}$, $C_{MLC}$, and $C_{TRM}$ are the coefficients to reflect the importance of IC, SLC, MLC, and TRM, respectively. These coefficients should be selected such that a node has a smaller rank if it discovers better default path. Otherwise, the node has a larger rank.

There are key differences between the provided routing path discovery mechanism and conventional RPL routing path discovery. 1) DIO message transmission: in conventional RPL, a node including the sink node uses a single transmission rate to transmit the DIO message and each DIO message is transmitted only once. However, a multi-rate node needs to transmit each DIO message multiple times to make sure that neighbors using different transmission rates can receive the DIO message. 2) Neighborhood: in conventional RPL, a node including sink node has only one neighborhood. However, a multi-rate node has multiple different neighborhoods corresponding to the multiple different transmission rates, e.g., a lower transmission rate corresponds to a larger neighborhood and a higher transmission rate corresponds to a smaller neighborhood. 3) Interference avoidance: conventional RPL does not consider the interference from other wireless networks. As more and more wireless technologies have been developed for IoT applications, the interference must be considered by routing technologies. The provided routing method considers interference from other wireless networks. In routing path discovery, a node is configured to avoid having highly interfered nodes in its routing path to sink node. With new functionality added, the invented coexistence and multi-rate capable RPL is called CoM-RPL.

Figure 6:
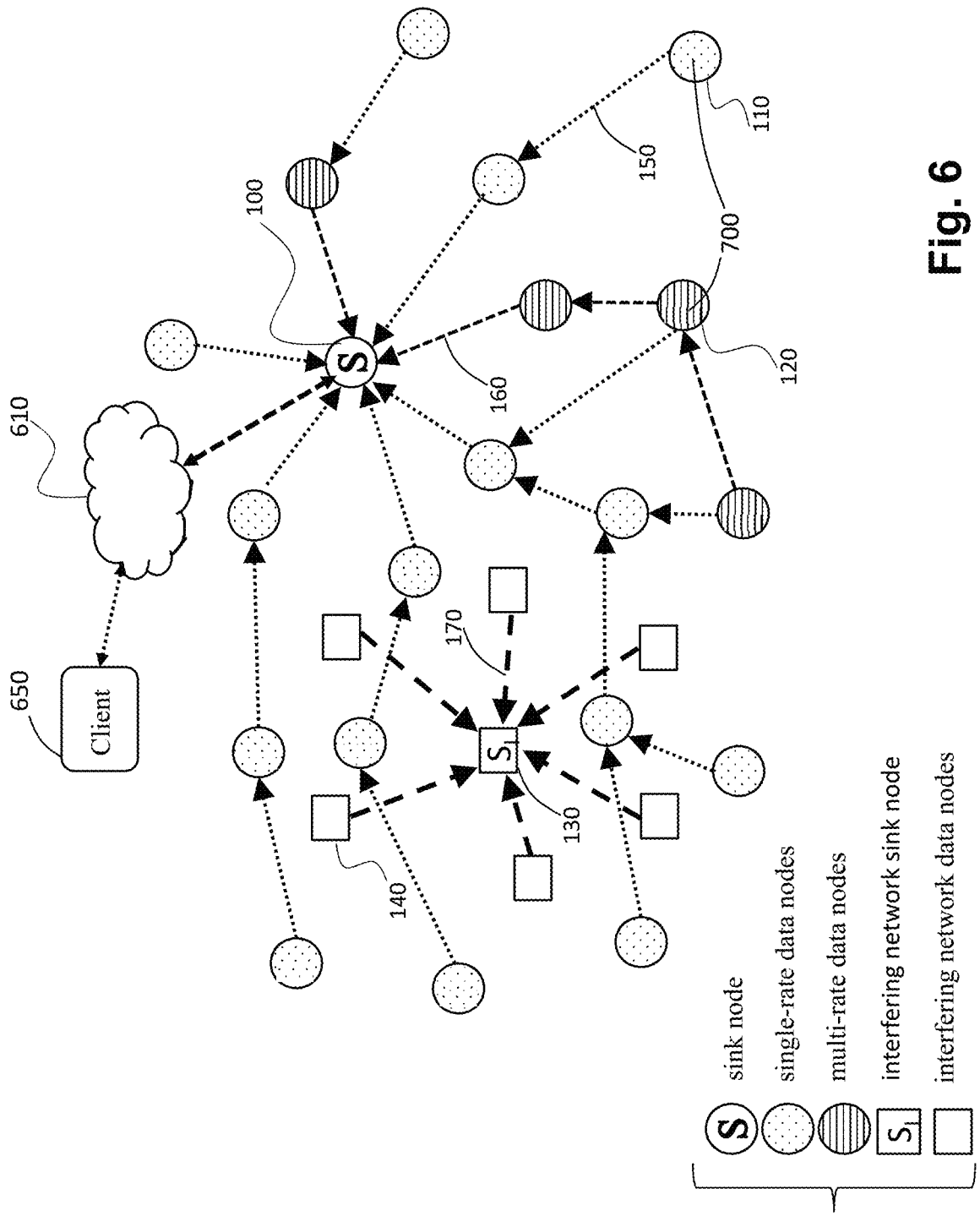
FIG. 6 illustrates an application scenario of wireless network that coexists with an interfering wireless network, according to embodiments of the present invention.

The above-described embodiments of the present invention can be applied in any of numerous ways. For example, FIG. 6 shows a use case scenario, in which the multi-hop wireless network is a smart meter network, and the interfering network is a Wi-Fi network. The sink node S of smart meter network connects to cloud 610 via wired or wireless connection. A client 650 of smart meter network such as power utility company connects to smart meter network via cloud to monitor the power usage of a neighborhood.

Figure 7:
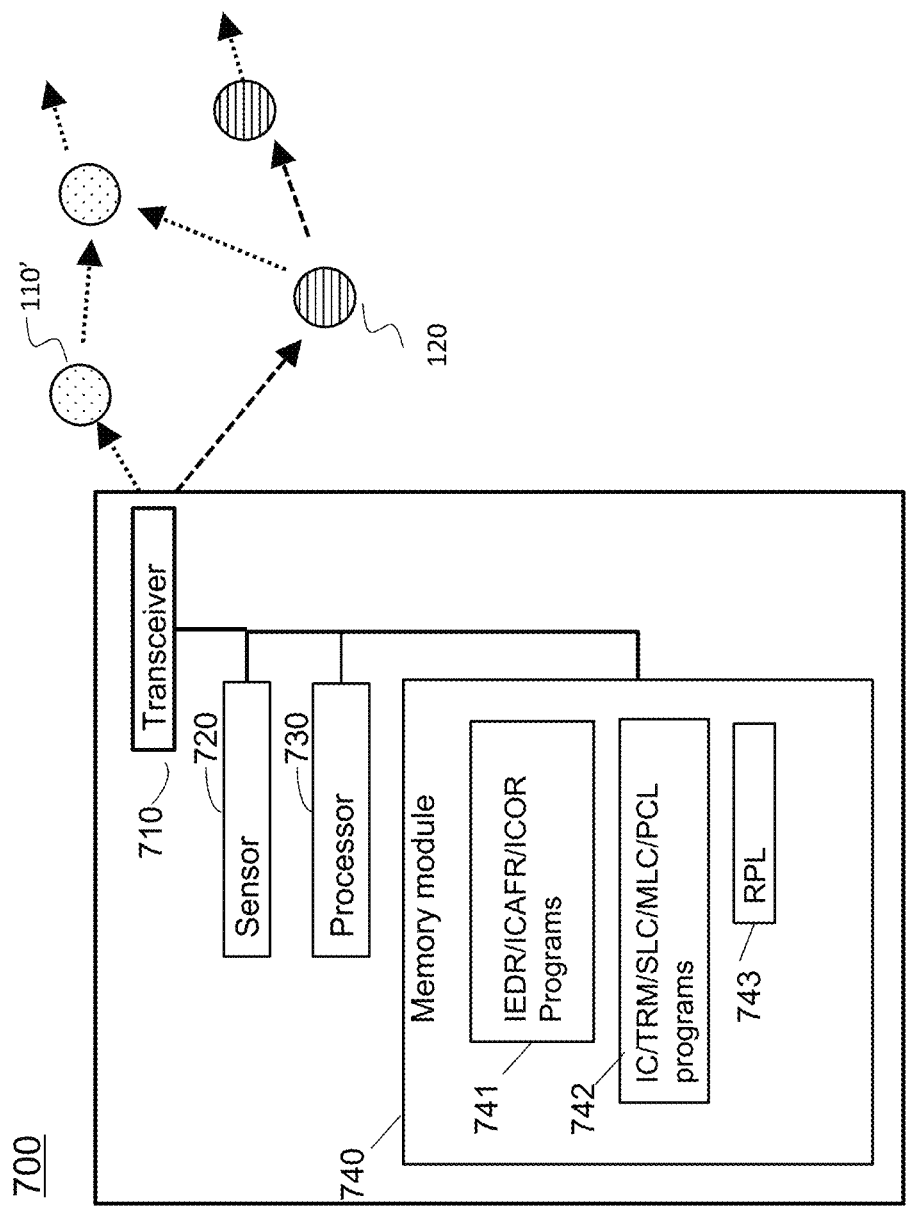
FIG. 7 demonstrates the implementation of the present invention in wireless devices, according to embodiments of the present invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. FIG. 7 shows an example of implementation, in which the present invention can be implemented in both single-rate node 100 and multi-rate node 120. The implementation 700 may be a node device 700 that includes a transceiver 710, a sensor 720, a processor 730 and a memory module 740, which stores IEDR/ICAFR/ICOR Programs 741, IC/TRM/SLC/MLC/PCL programs 742, and most importantly, the invented coexistence and multi-rate RPL (CoM-RPL) 743. In some cases, each node device 700 may be a smart meter and a network of multiple node devices 700 may be referred to as a smart meter network.

Figure 8:
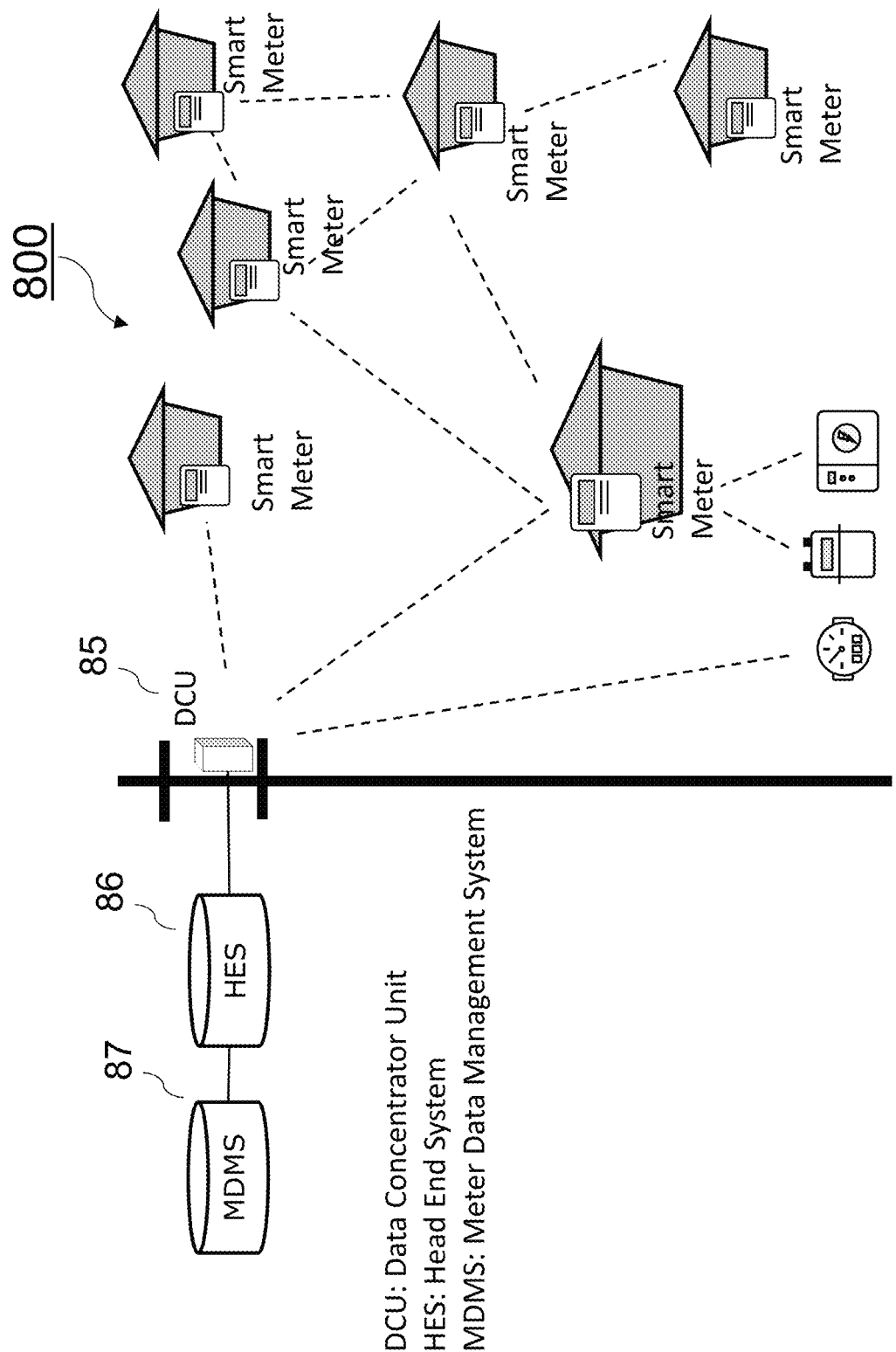
FIG. 8 is a schematic illustrating a smart meter network consisting of multi-hop wireless communication systems, according to embodiments of the present invention.

FIG. 8 is a schematic illustrating a smart meter network 800 consisting of multi-hop wireless communication systems, according to embodiments of the present invention. Each of the smart meters may include that includes a transceiver 710, a sensor 720, a processor 730 and a memory module 740, which stores IEDR/ICAFR/ICOR Programs 741, IC/TRM/SLC/MLC/PCL programs 742, and most importantly, the invented coexistence and multi-rate RPL (CoM-RPL) 743 such that each smart meter can collect gas, power, water meter data or any combination of the gas, power, water meter data. Each of the sensors of the smart meters is configured to remotely control sensors in the network. The collected data (gas, power, water meter data or any combination of the gas, power, water meter data) is provided to a meter data management system 87 (MDMS) via a head end system 86 (HES) and a data concentrator unit (DCU) 85. The smart meter network 800 may be a wireless communication network or a combination of wireless communication networks and wired communication network.

For instance, Bid Liaison and Energy Dispatcher (BLEnDer) is provided as a packaged software used for the multi-hop wireless communication systems, which is developed by Mitsubishi Electric in response to support utilities of the power industry and to realize smart meters for more efficient operations.

Further, the BLEnDer Intelligent Communication (ICE) battery-powered wireless communication terminals can be used in sensor networks including nodes (node devices) to collect gas and water meter data and remotely control sensors in the networks. The terminals are smart meters to be automatically read and both monitored and controlled remotely to achieve greater efficiency in the maintenance operations of utilities and infrastructure operators. Various tests conducted so far have demonstrated that the terminal operates and communicates stably in the field.

The BLEnDer Intelligent Communication Edge (ICE) terminal can be configured to work together with the BLEnDer HE (Head End) software (program) which manages and controls smart meters through various communication methods and the BLEnDer MESH software (program) which utilizes wireless multi-hop communication to realize a wide range smart meter communication network at a low cost. In this case, the memory module 740 is configured to store BLEnDer HE software configured to control smart meters and the BLEnDer MESH software configured to utilize wireless multi-hop communication to realize a wide range smart meter communication network.

Some embodiments of the present invention can be applied to the second generation smart meter system being expected to launched in 2024. Some embodiments can provide a solution for the mixing of two different communication networks that consist of single-rate nodes (SRNs) and multi-rate nodes (MRNs). According to some embodiments of the present invention, it becomes possible to handle at least two different communication systems that are mixed in the communication networks. The mixed environment may be some relay nodes in the network support two communication methods. For instance, Data Concentrator Unit (DCU) may support either communication method, the DCU may support both communication methods, and then the interference between the communication network can be substantially reduced.

In some cases, the mixed communication networks may be grouped into two systems, e.g. communication system A and communication system B.

For instance, the communication systems A and B can be grouped as follows;
Communication System A:
Bid Liaison and Energy Dispatcher (BLEnDer) MESH System;
802.15.4g FSK SRN/MRN
Extended IETF RPL
Communication System B:
New system Wi-SUN FAN System
802.15.4g FSK SRN or MRN
802.15.4g Orthogonal frequency-division multiplexing (OFDM)
IETF RPL(Routing Protocol for Low-Power and Lossy Networks)
MRN: multi-rate node
FSK: Frequency Shift Keying
IETF: Internet Engineering Task Force
RPL: Routing Protocol for Low-Power and Lossy Networks In this case, the calculation of the link metric can be different between Comm A and Comm B.

Figure 9:
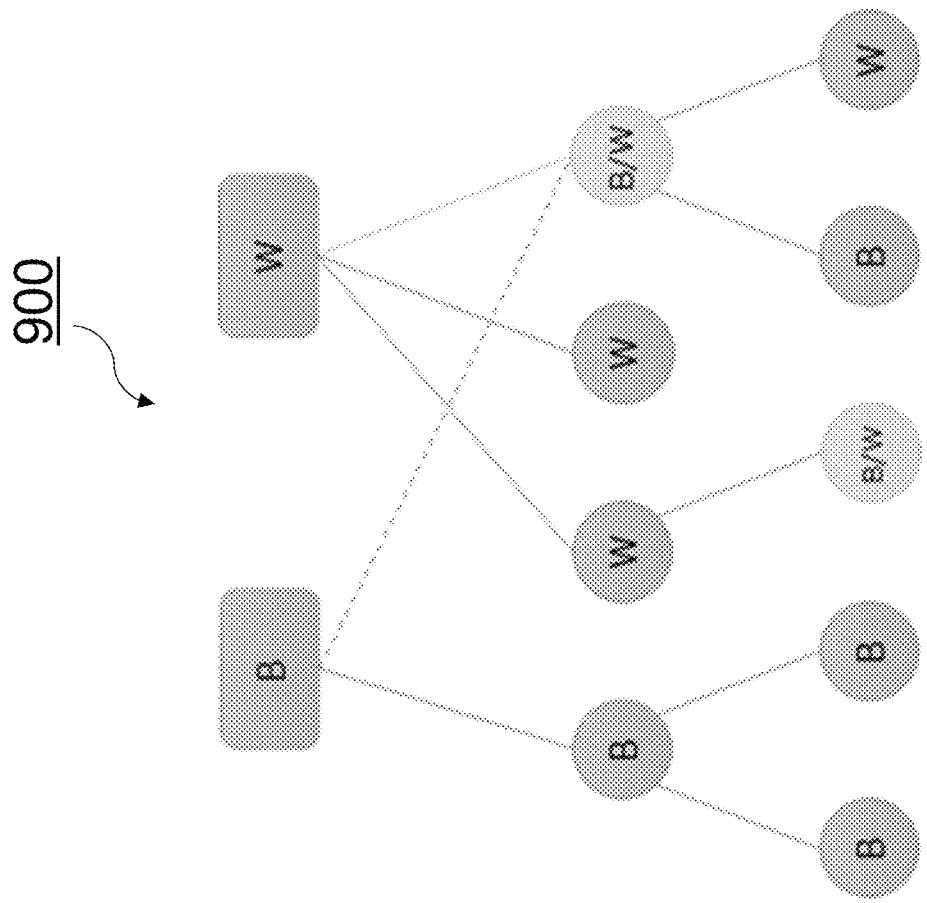
FIG. 9 is a schematic illustrating a communication network consisting of communication systems that include at least BLEnDer, Wi-SUN FAN and Hybrid of of BLEnDer and Wi-SUN FAN, according to some embodiments of the present invention.

FIG. 9 is a schematic illustrating a communication network 900 consisting of communication systems that include at least BLEnDer, Wi-SUN FAN and Hybrid of of BLEnDer and Wi-SUN FAN, according to some embodiments of the present invention. The interoperability of two communication systems can be realized between B (BLEnDer), W(Wi-SUN FAN), B/W (Hybrid of BLEnDer and Wi-SUN FAN).

B/W can connect both B and W, and handle date by appropriate route based on rank calculation, link metric, and so on. If needed, B/W converts lower node data from B to W (or W to B). Each node should identify RPL messages (like DIO) even though each node may receive two types of DIO from "B/W" node, when "B" and "W" will use same IEEE 802.15.4g (FSK) mode.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A node device for forming a multi-hop network configured to avoid interference from coexisting interfering networks, comprising:

a transceiver configured to receive and transmit data with respect to a Destination Oriented Directed Acyclic Graph (DODAG) Information Object message (DIO message);
a memory configured to store computer executable programs including an interfered-node count (IC), single-rate link count (SLC), multi-rate link count (MLC), hop count (HP), path communication latency (PCL) and an interference efficient and multi-rate supported routing program CoM-RPL; and
a processor configured to perform steps of the computer executable programs, wherein the steps comprise:
determining if the received DIO message indicates a new DODAG or an existing DODAG, wherein if a determined result in the determining indicates the new DODAG and no single-rate link and no interfered node on a path of the multi-hop network, the node device joins the DODAG network and the processor selects a sender of the DIO message as a default parent, computes a rank for itself, updates the DIO message with its rank, IC, SLC, transmission rate mode (TRM), HP, PCL and transmits scheduled DIO messages based on a transmission rate mode, and
if the path contains a single-rate node or/and an interfered node, the processor selects the sender of the DIO message as parent and starts a DIO waiting timer to wait for better paths, wherein the timer is up, the node device joins the multi-hop network, selects a default parent with the minimum communication path latency (CPL) and transmits the updated DIO message.

2. The node device of claim 1, wherein the processing DIO message for new DODAG includes judgements with respect to joining the DODAG and computations of rank, SLC, IC and PCL of node device, wherein the processing DIO for existing DODAG include computing the rank of SLC, IC and PCL of the node device, comparing the rank and determining up to PARENT SET SIZE parents of the node device,
wherein the default value of PARENT SET SIZE is 3 and the rank is computed using $$R=R_D+R_I+C_{IC}*IC+C_{SLC}*SLC+C_{MLC}*MLC+C_{TRM}*TRM,$$

where $R_D$ is the rank of default parent, $R_I$ is the rank increase computed by using conventional routing protocol for low-power and lossy networks (RPL) routing metrics and object functions, $C_{IC}$, $C_{SLC}$, $C_{MLC}$, and $C_{TRM}$ are the coefficients to reflect the importance of IC, SLC, MLC, and TRM, respectively.

3. The node device of claim 1, wherein if the determined result indicates the new DODAG and the path contains the single-rate node or/and the interfered node, the processor starts a DIO waiting timer, selects a default parent and schedule to transmit DIO messages.

4. The node device of claim 1, wherein if the determined result indicates the existing DODAG and the node device has joined DODAG and its rank is greater than the rank of the DIO sender and the node device does not have enough parents, the processor adds the sender to the parent set f the node device joined DODAG and its rank is greater than the rank of the DIO sender and the node device has enough parents, the node device updates the parent set by replacing an existing parent with the DIO message sender if the DIO message sender provides a better routing path.

5. The node device of claim 1, wherein if the determined result indicates the existing DODAG and the node device joined DODAG and the rank of the node device is not greater than the rank of the DIO sender, the processer discards the DIO message.

6. The node device of claim 1, wherein if the determined result indicates the existing DODAG and the node device has not joined DODAG and SLC=0 and IC=0, the processer sets the sender as a default parent, computes a rank of the node device, updates the parent set, updates the DIO and transmits scheduled DIO messages based on the transmission rate mode.

7. The node device of claim 1, wherein if the determined result indicates the existing DODAG and the node device has not joined DODAG and SLC=0 and IC=0 are unsatisfied, another judgement is made if the node has enough parents.

8. The node device of claim 7, wherein if a result of the other judgement indicates that the node device does not have enough parents, the processer adds the sender to the parent set, otherwise, if the node device has enough parents, the processer updates the parent set by replacing an existing parent with the DIO message sender if the DIO message sender provides a better routing path.

9. The node device of claim 1, wherein an interfered-node count (IS) is computed by one or combination of an interfering energy detection rate (IEDR), an interfered channel access failure rate (ICAFR) and an interfered channel occupancy ration (ICOR), wherein $$IS = 1 + \frac{x}{1-x},$$

wherein x is a number computed by using one or combination of IEDR, ICAFR and ICOR.

10. The node device of claim 1, wherein the multi-hop network includes at least one node device that can not directly communication with a sink node and packet exchange with the sink node through at least one intermediate node device relaying the packets between the node device and the sink node.

11. The node device of claim 1, wherein the multi-hope network includes at least one sink node, at least one single-rate node (SRN), at least one multi-rate node (MRN) or combination of the at least one sink node, the at least one single-rate node and the at least one multi-rate node.

12. The node device of claim 1, wherein the node device further comprises an energy detector configured to measure a signal energy level.

13. The node device of claim 12, wherein the processor determines a severity of an interference using an interfering energy detection rate (IEDR) defined based on a ratio between a total number of signal transmissions ($ED_t$) detected by a node device in the multi-hop network and a total number of interfering signal transmissions ($ED_i$) transmitted from interfering networks that are different from the multi-hop network, wherein $$IEDR = \frac{ED_i}{ED_t}.$$

14. The node device of claim 1, wherein the processer determines a severity of interference based on an interfered channel access failure rate (ICAFR).

15. The node device of claim 14, wherein the ICAFR is computed based on a total number of transmission attempts ($N_{tx}$) by a node device in multi-hop network, and a total number of channel access failure ($N_{caf}$) counted by the node device in multi-hop network, and the number of channel failure caused by the multi-hop network transmission ($N_m$), $$ICAFR = \frac{N_{caf} - N_m}{N_{tx}}.$$

16. The node device of claim 1, wherein the node device further comprises a channel status sensing function configured to measure a channel busy time period $T_b$ for a time period T with respect to data transmissions, data receptions or combination of the data transmissions and the data receptions.

17. The node device of claim 16, wherein the processor determines a severity of an interference based on an interfered channel occupancy ratio (ICOR) using the busy time period $T_b$ and a channel busy time consumed by the multi-hop network $T_m$ for a time period T, $$ICOR = \frac{T_b - T_m}{T}.$$

18. The node device of claim 1, wherein the processor determines an interference severity (IS) metric using one or combination of an interfering energy detection rate (IEDR), an interfered channel access failure rate (ICAFR) and an interfered channel occupancy ratio (ICOR) as $$IS = 1 + \frac{x}{1-x},$$

where x can be one of IEDR, ICAFR and ICOR.

19. The node device of claim 1, wherein the transceiver is configured to communicate via at least one wireless network based on transmission rate mode (TRM).

20. The node device of claim 1, wherein the computer-executable programs include a Bid Liaison and Energy Dispatcher (BLEnDer) head end program configured to control smart meters and a BLEnDer MESH program configured to utilize wireless multi-hop communications in the multi-hop network.

21. A non-transitory computer-executable medium storing instructions that cause a processor to perform steps of:
  determining if a received Destination Oriented Directed Acyclic Graph (DODAG) Information Object (DIO) message indicates a new DODAG or an existing DODAG, wherein if a determined result in the determining indicates the new DODAG and routing path contains no interfered node and no single-rate node, the processor selects a sender of the DIO message as a default parent, computes a rank of a node device, updates the DIO message and transmits the scheduled DIO messages based on transmission rate mode, wherein multi-rate node transmits the DIO message multiple times, and
  wherein if the determined result indicates the existing DODAG, the processor joins the DODAG if the routing path provided by the DIO message sender contains no interfered node and no single-rate node or the processor updates a parent set if the routing path contains interfered node or/and single-rate node or the node device joined DODAG already.

* * * * *